S. King,
Making Stares.
Nº 1,322.    Patented Sep. 14, 1839.
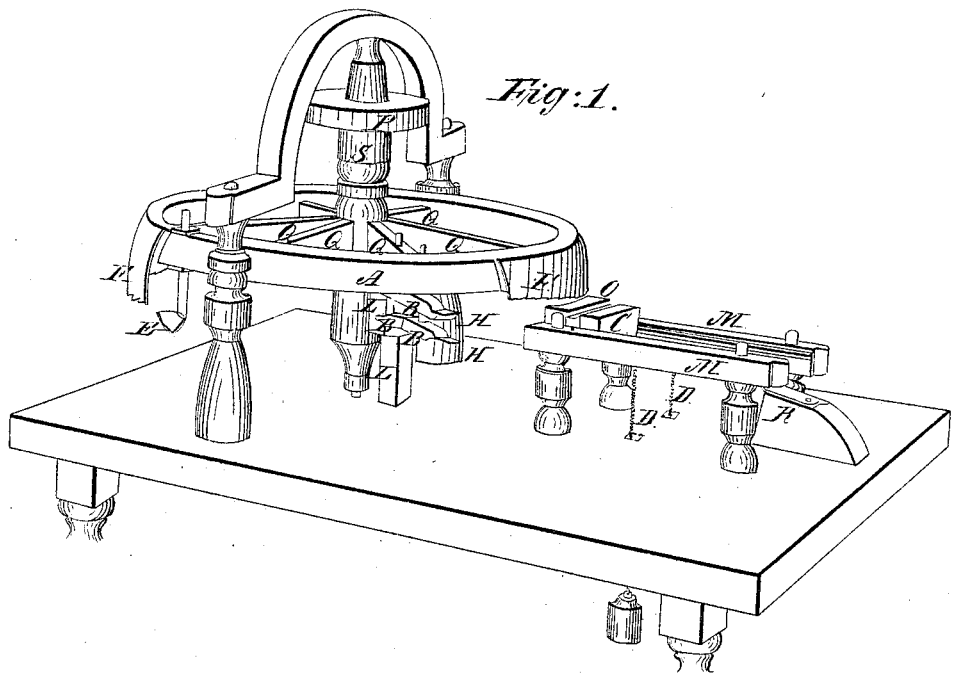
Fig: 1.
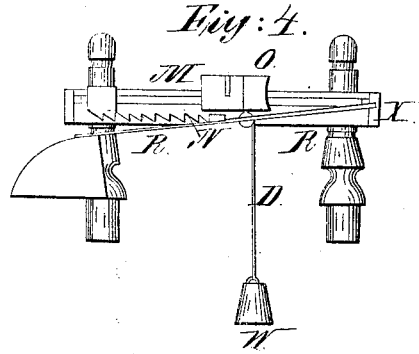
Fig: 4.
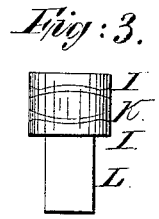
Fig: 3.
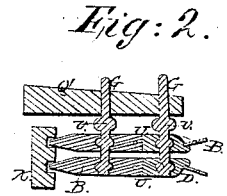
Fig: 2.
Witnesses:
Robert O'Brien
S. H. Clark
Inventor:
Summer King

UNITED STATES PATENT OFFICE.

SUMNER KING, OF SUFFIELD, CONNECTICUT.

MACHINE FOR SAWING AND JOINTING STAVES.

Specification of Letters Patent No. 1,322, dated September 14, 1839.

*To all whom it may concern:*

Be it known that I, SUMNER KING, of Suffield, in the county of Hartford and State of Connecticut, have invented a new and useful Improvement, being a Machine for Sawing or Cutting and Jointing Staves, called "King's Rotary Stave-Machine," which is described as follows, reference being had to the annexed drawings of the same, making part of this specification.

Figure 1 is a perspective view of the machine. Fig. 2 is a section showing the jointers. Fig. 3 is a section showing the grooves along which the ends of the jointer arms move; Fig. 4, section showing the feeding apparatus.

Similar letters refer to similar parts in the several figures.

First a shaft S is to be erected in a suitable frame of proper size and strength. From said shaft radiate any convenient number of arms Q. To the extremities of said arms is fixed a circular rim A convex on the outer periphery. The degree of the circle of the rim is to correspond with that of which each stave (longitudinally) is a segment and of course to be variable at pleasure according to the kind of cask or barrel for which the staves are to be made. On the convex surface of the rim is to be fastened a convex saw F of any required length for cutting a stave from a block of wood held firmly by dogs to a movable carriage made to advance to the saw by weight springs, or other contrivances as the staves are cut. The convexity of the saw longitudinally must correspond with the convexity of the required stave lengthwise and its convexity transversely must correspond with the required shape of the stave crosswise. The saw increases gradually in width from one end toward the other end—that is to say, the first tooth of the saw in cutting will be on a line with the upper side of the stave block and the succeeding teeth gradually descend or widen from the upper or horizontal edge of the saw until the last tooth is below the under side of the stave block, thus the saw will be wide enough at the hind end to pass entirely through the block and cut off a stave at every revolution of the wheel. When it is required to cut two staves at every turn of the wheel another saw similarly shaped must be placed parallel to the first described with a curved band or block placed between them so as to keep the saws as far apart as the required thickness of the stave. When three staves are required at every cut a third saw and a block must be added and so on. And there may be as many gangs of such saws fixed to the outside of said wheel as its circumference and the length of the saws will admit. The shaft of the wheel turns on pivots in boxes in the frame by means of a band leading from the driving power around a pulley P fixed on said shaft S.

The jointing of the stave is performed in the following manner: There are two cutters H H that are made to expand, the one from the other as they cut into the stave block the depth of the thickness of the stave, commencing at the one end and continuing to expand and cut until the cutters arrive at the middle of the block or the greatest width of the bilge of the stave where they begin to contract or approach each other gradually and equally until they arrive at the other smaller end of the stave, said cutters being placed at a proper angle to cut the bevel of the edges at the same time. These cutters are fastened to the ends of jointed arms B, B, placed nearly parallel to each other in advance of the saw, said arms being attached to one of the arms of the revolving circular rim by means of two vertical hanging arms G G extending downward below the bottom of the horizontal arm Q, having their lower ends formed into balls V which enter sockets in the two parts of the lower arm B to act as a universal joint in order to allow each of said arms to have a curvilinear movement corresponding with the intended curve line of the edge of the stave which movement is effected by causing the rear end of the arm B to pass along a groove I corresponding in shape with the shape of one edge of the stave.

The arm B of the upper cutter moves on balls and sockets in a similar manner, its curvilinear movement being effected in like manner by a groove I corresponding with that just described. Both grooves are made in a block K supported by a standard L of the frame. The joints of the arms are at U. The rear ends of the arms are beveled and made smooth in order to pass easily along the grooves I in expanding and contracting the cutters for jointing the staves.

The feeding or advancing the carriage with the stave bolt or block toward the saws is effected by means of weights in the following manner: There are two parallel ways M, M, between and upon which the carriage moves. The carriage is grooved at the sides and moves on the ways. Two notched plates or racks are fastened to the under side of the carriage against the teeth of which engages a cross arm fastened to a spring R secured to a block on the frame. Weights W are suspended by cords D to the carriage C which cords pass over pulleys in the usual mode, said weights keeping the carriage and bolt up to the saw while cutting, the bolt being secured to the headblock in the usual or best mode. To the outer extremity of said spring R is fastened a cam X, against which an arm E attached to the revolving wheel comes in contact as the wheel revolves immediately after the saw has passed the block, presses said spring down, which disengages the arm from the notches of the rack and the weights then cause the carriage to advance with a block toward the saw for a new cut. When the block is entirely cut up into staves the spring is depressed and the carriage run back to receive a new bolt.

The before described wheel and saws may be placed in a vertical position. Cutters, or chisels of unequal lengths may be used instead of the saws. Also a sharpedged plate. There may be another saw made in the same manner as the one before described, placed with its teeth upward or toward those of the upper saw and secured to a similarly shaped rim. The forward or small end of one saw to strike on the top of the stave block and the forward end of the other saw to strike on the under side of the block, so that each saw shall cut half way through the block, the hind or large ends coming nearly together and thus when they pass around they will cut the stave off from the block. The lower rim or wheel is to be secured to its place by short arms attached to the arms of the top wheel, the arms of the lower wheel to be made short so that they will not interfere with the grooved block and post that guide the jointing apparatus. The saws on the rim on said proposed lower wheel are not to extend all the way around the wheel, but a vacancy should be left sufficient to let up the timber for another stave when one is cut off.

There may be several carriages placed around the wheel so that staves may be cut from several blocks at one revolution. In all cases where the staves are to be jointed the blocks or bolts should remain stationary until the stave is cut off. But when the staves are not jointed and the wheel passes around more than once to cut off the stave then the bolts should be raised up to the saws or cutters. When one stave is cut off the block or bolt should be set up again for another cut in the manner before described, or some other similar manner.

The advantages to be derived from having the cutters move around instead of cutting straight through the timber is that the staves are not liable to crack, and also the staves can be jointed at the same time.

The invention claimed and desired to be secured by Letters Patent consists—

1. In making the saws or cutters project below the plane of motion of the wheel more at one end than at the other so as to cut the stave through without feeding the block up to the saw or saws or depressing them to the block, in the manner herein described.

2. The method of jointing the staves by means of the two cutters attached to the jointed arms and governed by the grooves I, I, as herein described, and, 3. The mode of setting the timber from which the staves are cut up to the saw by the combined action of the racks (impelled forward by the weights) and the spring catches worked by the arm E, all as herein described.

SUMNER KING.

Witnesses:
 JULIUS HARMON,
 LORENZO NELSON.